US010282544B2

(12) United States Patent
Brand et al.

(10) Patent No.: US 10,282,544 B2
(45) Date of Patent: May 7, 2019

(54) IDENTIFYING SUSPECTED MALWARE FILES AND SITES BASED ON PRESENCE IN KNOWN MALICIOUS ENVIRONMENT

(71) Applicant: Microsoft Technology Licensing, LLC, Redmond, WA (US)

(72) Inventors: Tomer Brand, Hod Hasharon (IL); Dan Michelson, Rakefet (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 14/283,089

(22) Filed: May 20, 2014

(65) Prior Publication Data

US 2015/0341372 A1 Nov. 26, 2015

(51) Int. Cl.
*H04L 29/06* (2006.01)
*G06F 21/56* (2013.01)

(52) U.S. Cl.
CPC ............ *G06F 21/56* (2013.01); *H04L 63/145* (2013.01); *H04L 63/1416* (2013.01); *G06F 2221/2101* (2013.01)

(58) Field of Classification Search
CPC ................................ H04L 63/00; G06F 21/00
See application file for complete search history.

(56) References Cited

U.S. PATENT DOCUMENTS

| | | | |
|---|---|---|---|
| 6,597,892 B1 * | 7/2003 | Caldwell, III | ..... H04B 7/18519 370/241 |
| 8,068,054 B2 * | 11/2011 | Levin | ...................... G01S 19/21 342/357.4 |
| 9,386,034 B2 * | 7/2016 | Cochenour | ........... H04L 63/145 |
| 2003/0188189 A1 | 10/2003 | Desai et al. | |
| 2007/0150957 A1 | 6/2007 | Hartrell et al. | |
| 2009/0300764 A1 | 12/2009 | Freeman | |

(Continued)

FOREIGN PATENT DOCUMENTS

| | | |
|---|---|---|
| CN | 1841397 A | 10/2006 |
| CN | 101986324 A | 3/2011 |
| CN | 103795703 A | 5/2014 |

OTHER PUBLICATIONS

Provos, et al., "The Ghost in the Browser Analysis of Web-based Malware", In Proceedings of the first conference on First Workshop on Hot Topics in Understanding Botnets, Apr. 10, 2007, 9 pages.

(Continued)

*Primary Examiner* — Joseph P Hirl
*Assistant Examiner* — Leynna T Truvan
(74) *Attorney, Agent, or Firm* — Klarquist Sparkman, LLP

(57) ABSTRACT

Disclosed herein is a system and method for identifying potential sources of malicious activity as well as identifying potentially malicious files that originated from suspected malicious sources. Using an anchor event and telemetry data from devices known to have been infected by malicious activity similar events in the telemetry data between two devices can be identified. These satellite events are then used to identify other files that may have been deposited by the satellite event such that those files can be highlighted to a malware researcher. Additionally, the malware protection may be updated based on this analysis to label an associated site with the satellite event as a malicious site such that the site may be blocked or quarantined.

20 Claims, 4 Drawing Sheets

(56) References Cited

U.S. PATENT DOCUMENTS

2012/0066759 A1 3/2012 Chen et al.
2012/0102568 A1 4/2012 Tarbotton et al.
2013/0347111 A1 12/2013 Karta et al.

OTHER PUBLICATIONS

Rajab, et al., "Trends in Circumventing Web-Malware Detection", In Google Technical Report Rajab-2011a, Jul. 2011, 12 pages.
Curtsinger, et al., "ZOZZLE: Fast and Precise In-Browser JavaScript Malware Detection", In Proceedings of the 20th USENIX Conference on Security, Aug. 8, 2011, 16 pages.
Egele, et al., "Defending Browsers against Drive-by Downloads: Mitigating Heap-spraying Code Injection Attacks", In Proceedings of the 6th International Conference on Detection of Intrusions and Malware, and Vulnerability Assessment, Jun. 29, 2009, 19 pages.
Provos, Niels, "All about Safe Browsing", Published on: Jan. 31, 2012, Available at: http://blog.chromium.org/2012/01/all-about-safe-browsing.html, 4 pages.
Schutt, et al., "Early Detection of Malicious Behavior in JavaScript Code", In Proceedings of the 5th ACM Workshop on Security and Artificial Intelligence, Oct. 19, 2012, 9 pages.
Song, et al., "Preventing Drive-by Download via Inter-Module Communication Monitoring", In Proceedings of the 5th ACM Symposium on Information, Computer and Communications Security, Apr. 13, 2010, 11 pages.
Ye, et al., "Combining File Content and File Relations for Cloud Based Malware Detection", In Proceedings of the 17th ACM SIGKDD International Conference on Knowledge Discovery and Data Mining, Aug. 21, 2011, 9 pages.
Chau, et al., "Polonium: Tera-Scale Graph Mining and Inference for Malware Detection", In Proceedings of Siam International Conference on Data Mining, Apr. 28, 2011, 12 pages.
International Search Report and Written Opinion Issued in PCT Application No. PCT/US2015/031286, dated Jul. 22, 2015, 12 Pages.
Second Written Opinion Issued in Patent Application No. PCT/US2015/031286, dated Mar. 16, 2016, 07 Pages.
"First Office Action and Search Report Issued in Chinese Patent Application No. 201580025669.9", dated Aug. 31, 2018, 17 Pages.
"International Preliminary Report on Patentability Issued in PCT Application No. PCT/US2015/031286", dated Jul. 25, 2016, 7 Pages.

* cited by examiner

IDENTIFYING SUSPECTED MALWARE FILES AND SITES BASED ON PRESENCE IN KNOWN MALICIOUS ENVIRONMENT

TECHNICAL FIELD

This description relates generally to automatically identifying potential malware and sources of malware based on analysis of known anchors and telemetry data to find satellite sources of malware.

BACKGROUND

Malware detection and identification is a complex process that requires a substantial amount of human involvement. Developers of malware are always trying to outsmart the malware detection and removal companies by constantly adapting and modifying the shape and behavior of the malware. As malware detection relies on signatures malware developers are able to stay one step ahead of the detection companies through this constant changing and adapting of their malware files requiring the malware detection companies to constantly adapt the signatures to detect the changed malware.

Current malware detection relies on companies and individuals to submit samples of malware or suspected malware after an infection or attack has occurred. A malware researcher will analyze the file and develop a signature for that file. This signature will then be pushed out to the detection programs so that the file will be identified in the future as malware. The malware researcher spends a large amount of time trying to determine if a particular file is in fact malware or is a benign file.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for determining whether an unknown file is malware or benign file or if a computing system has been infected by malware or is soon to be infected with malware. The present disclosure uses cloud and distributed computing to receive from multiple machines information about a large number of files and activities performed by those machines/devices. Some of these files may be malware while some of the files may not. By aggregating the information about the large number of files the system is able to determine characteristics about the files that may make a file malware or not. Additionally, the system is able to identify a source event that possibly leads to the infection of the machine. Additionally, the system is able to reveal a chain of events that lead to an infection.

The system analyzes telemetry data from each of the devices starting with a detected or known malware event or other event type. The system then looks back in time to identify a common source event that occurs in multiple telemetry data streams such that the source event can be labeled or identified as being a potential malicious or compromised source. As there are many machines in the system the same source event will likely appear on multiple telemetry data streams for infected machines. Once a source has been identified for the malicious event the protection software can be updated to protect other machines if they encounter the source event. In this way it is possible to outsmart the malware authors by identifying the source of the malicious activity and blocking access to the associated site or flagging all files from that site for further investigation. This allows for protection of the machines based on the context in which the file appears without regard for the signatures associated with the malicious files content.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
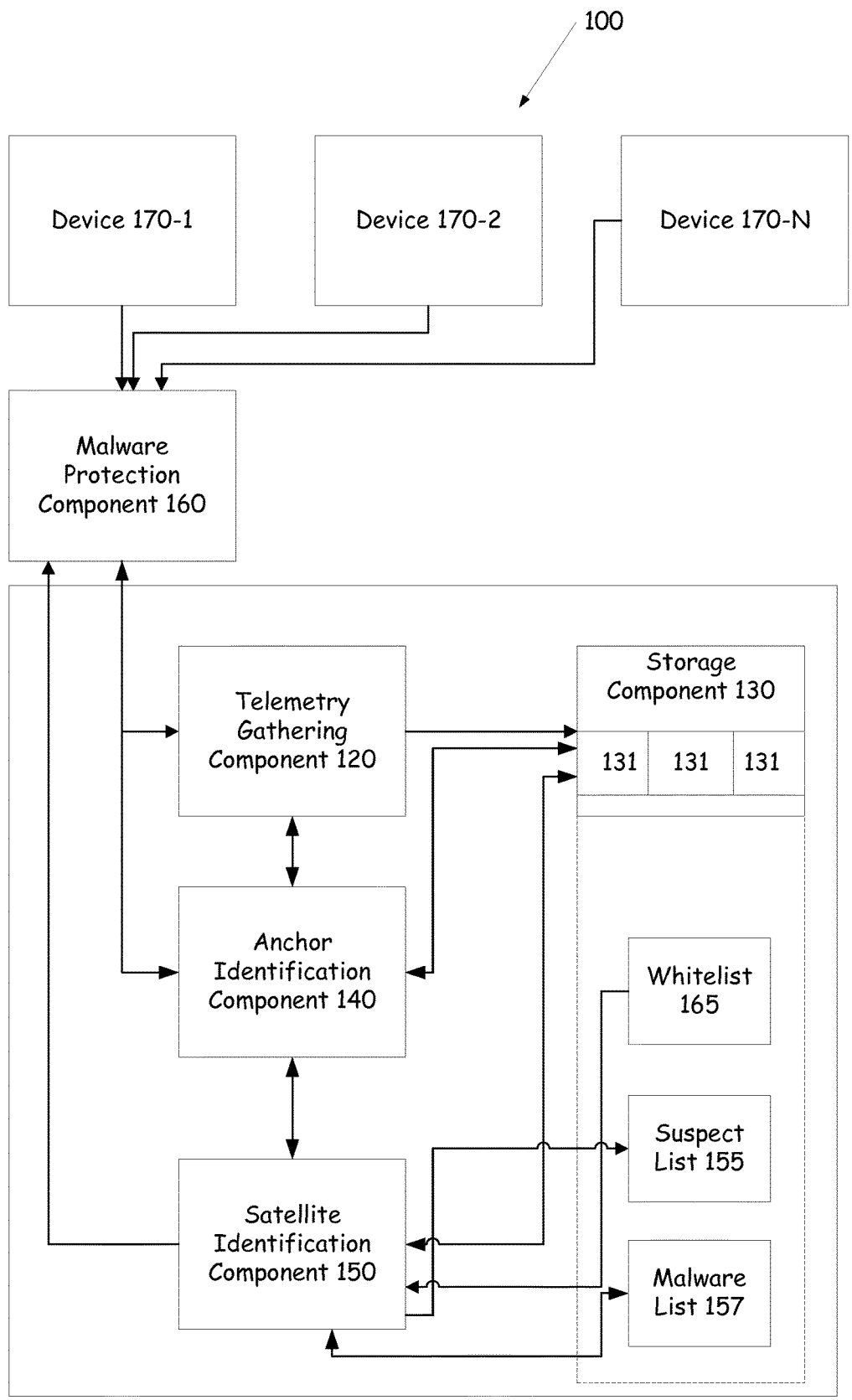
FIG. 1 is a block diagram illustrating components of the malware detection and protection system according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

The identification of malware has been a constant game of cat and mouse between developers of malware or malware authors who desire to inflict their malicious code on computer systems and the analysts who try to block the malware from taking hold and inflicting the damage on users and computer systems. Malware developers constantly change or modify their tactics in creating the malware to make it more difficult for anti-malware programs to identify, isolate and remove malware. Typically malware is identified when users submit samples of malware to a malware researcher after their system has become infected by the malware component. The researcher investigates a submitted malware sample and determines if the sample is in fact malware and not something else and if it is malware then the researcher identifies a signature for the malware. This malware signature is then published so that anti-malware programs can make use of the signature to identify a file as malware when presented to a system hosting the anti-malware program.

However this approach to identifying malware is extremely labor intensive as the researcher must evaluate each submitted malware candidate to determine if the candidate is in fact malware. Worldwide there are very few malware researchers actively handling malware samples. Often these malware researchers are all looking at the same or similar malware candidates. This reduces the number of unique malware candidates that can be looked at on a daily basis. Current estimates indicate that there are over 200,000 new malware samples produced each day and approximately 500,000 files reported as suspect files. The sheer numbers of suspect files and the number malware samples generated daily and the time it takes to manually analyze the suspect files and generate an associated signature for actual malware makes it more likely that a malware sample may run in the wild for a number of days before a signature is found and published.

The present disclosure presents a system and method for automatically identifying suspect files as well as identifying potentially compromised sites that may be presented to a researcher for consideration as malware while providing protection for the end user by correlating unknown files with potentially compromised sites.

The present disclosure introduces some terms that will be used within this discussion. For purposes of clarity and ease of reading the following definitions are provided for these terms. These definitions are not intended to be limiting in meaning, but merely to assist in understanding.

Anchor—An anchor is an event or signal which is known to be malicious or related to malicious activity. It is also referred to as an anchor event. An anchor may also be an event that appears to be malicious without actually having been determined that it is malicious, this is a suspicious event.

Anchor Timeframe—The timeframe around the anchor which is considered by the system to be the area of interest for determining a source of a malicious file or event.

Satellite Files, Satellite Events (collectively "satellite")—Files or events reported and/or found in the anchor timeframe on a machine where the anchor was identified.

FIG. 1 is a block diagram illustrating components of the malware detection and protection system 100 according to one illustrative embodiment. System 100 includes a telemetry gathering component 120, a storage component 130, an anchor identification component 140, a satellite identification component 150, a malware protection component 160, and devices 170-1, 170-2, 170-N (collectively device 170).

Malware protection component 160 is in one illustrative embodiment an anti-malware program that is installed or operating on the devices 170. However, in other embodiments the malware protection component 160 may be co-located with the telemetry gathering component 120. The malware protection component 160 is configured in some embodiments to scan files as they are installed on the devices 170. In some embodiments the malware protection component 160 scans the devices 170 periodically (or continuously) to determine if any malicious files or activity can be detected. When a malware event is detected the malware protection component 160 generates telemetry data for the detected event. While the present discussion discusses a malware event, those skilled in the art will understand that this event can include any suspicious event. A suspicious event may refer to the malware detection event, known malware events, an unknown event, or events that have been received from external sources specifying information about an event, such as specifying pairs of machines and a time of an event.

This telemetry data can include all of the processes running on the device 170, the files that were opened on the device 170, files that were downloaded by the device 170, files that were modified by the device 170, the websites or internet sites that were accessed by the device 170, or any other activity or configuration that can be reported by the device 170. These files can include both malicious and benign files. This telemetry data includes data for a period of time prior to the detected event. This amount of time can in some embodiments be configured by a user or administrator. The malware protection component transmits or otherwise provides the collected telemetry data for the device 170 to either the anchor identification component 140 or the telemetry gathering component 120. However, in other embodiments the telemetry data can be constantly generated and reported either the anchor identification component 140 or the telemetry gathering component 120.

The anchor identification component 140 is, in one embodiment, a component of the system 100 that is configured to identify the anchor in the telemetry data and annotate the data. In one embodiment, the anchor identification component 140 queries the telemetry data to obtain a subset of events. From there it takes the anchors which are a set of machine id and time pairs for use by the satellites identification component 150. Once the telemetry data has been gathered the anchor identification component 140 annotates the telemetry data with the specific anchor item in the telemetry data. The detected anchor or anchor event is the event upon which the baseline for the telemetry data is reported on. As mentioned above the anchor event can be the detection of a malware event such as a virus, a Trojan, or other malicious file. However in some embodiments it can be a detection by the malware protection component 160 of activity on the monitored device 170 that is unusual or otherwise suspicious. As such the identification of the anchor as well as the event of the anchor is important for the further analysis of the telemetry data. The identification of the anchor in the telemetry data is generally independent of any other telemetry data reporting that is done by the devices 170. Each anchor is a single isolated event on that device 170. In some embodiments the anchor identification component 140 is on the devices 170, in other embodiments it is collocated with the other component of the system 100 such as on the same server.

Telemetry gathering component 120 is, in one illustrative embodiment, a component configured to gather or collect telemetry data from a variety of sources, such as devices 170. This telemetry data is typically comprised of signals that are received from the malware protection component 160 associated with the devices 170. This signal includes activities or events that were associated with the device 170 such as the files opened, downloaded, saved, modified, processor activity, locations (e.g. websites or applications) accessed, registry keys update, network traffic (e.g. protocol or destination points) etc. This signal, in some embodiments, includes activity from the associated device 170 for a predetermined period of time prior to the detected anchor event. In some embodiments the telemetry data can also include activity after the detected anchor event. The received telemetry data has in some embodiments already been tagged by the anchor identification component 140 with the anchor. However, in other embodiments the telemetry gathering component 120 may request from the anchor identification component 140 that the anchor be identified. In this embodiment the telemetry data may include information indicating what event or events caused the telemetry data to be reported. In some embodiments the telemetry gathering component 120 receives a set of events from external sources. These external sources can be sources that provide event information outside of the received telemetry data of the devices 170. This information may be a list of events that have been identified, but may not be part of the malware protection, may be telemetry data gathered from other systems or from researcher analysis.

Once the telemetry data has been gathered, this data is stored in the storage component 130. Storage component 130 may be any medium or device 170 in which data may be stored and later retrieved. The various telemetry data streams stored in the storage device are indicated by items 131 in FIG. 1.

The satellite identification component 150 is, in one illustrative embodiment, a component of the system 100 that is configured to identify from the telemetry data other files, applications, websites or activities outside of the anchor which may either be malicious in and of itself or may be the root cause of the infection to begin with. As the telemetry gathering component 120 is able to gather telemetry data from a number of different devices 170 it becomes possible for the satellite identification component 150 to identify interesting similarities between the reported telemetry data from each of the devices 170. As each device 170 reports in its telemetry data and the anchor event that caused the telemetry data to be sent, the satellite identification component 150 is able to look at the anchor event and other events around the anchor event outside of a vacuum that would typically be experienced by a single device 170.

Figure 2:
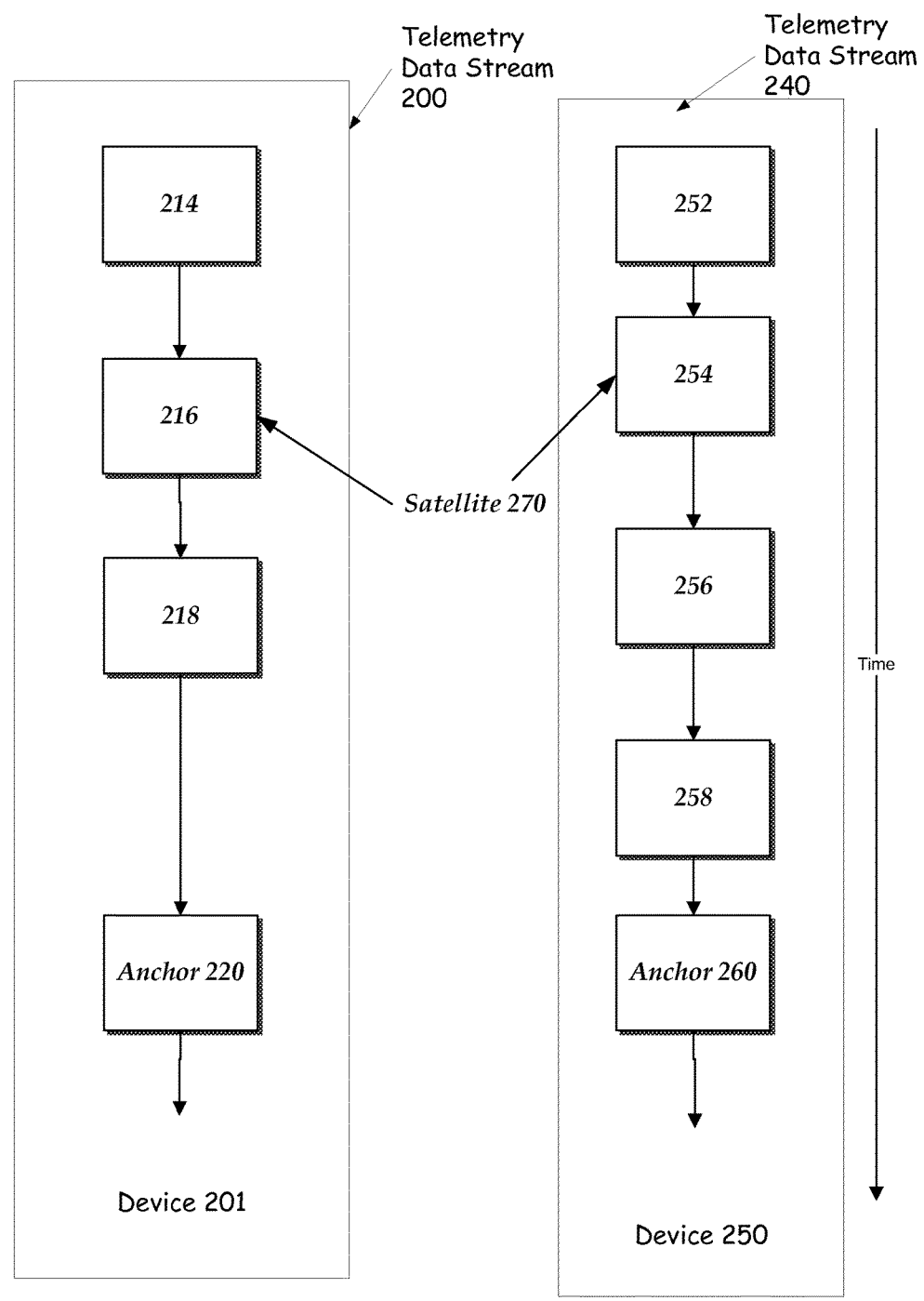
FIG. 2 illustrates two exemplary telemetry data streams from two different devices according to one illustrative embodiment.

In one embodiment, the satellite identification component 150 examines a subset of the telemetry data that was received from the devices 170 to analyze. The satellite identification component 150 looks at each anchor event and determines if there was another event contemporaneously with the anchor in the telemetry data for other devices 170. That is, is there an event that occurs within the anchor timeframe? The anchor timeframe can be any period of time. In some embodiments the anchor timeframe is a few minutes. In other embodiments the anchor timeframe is an hour. However, the anchor timeframe can extend out as far as a few days. Further, in some embodiments the anchor timeframe includes time after the anchor event, whereby the anchor event occurs at a point in the middle of the anchor timeframe. As such the contemporaneous event can occur after the anchor event. In some embodiments the comparison of the telemetry data by the satellite identification component 150 compares the telemetry data for one device with telemetry data streams that are known to include malicious activity. By looking before and after the event the satellite identification component is able to identify common related events, i.e. the contemporaneous events. When starting with a set of known malicious events, the common related events are more likely to be malicious. When starting with a set of suspicious events, if the common related events are known as malicious, the starting set is more likely to be malicious too For example, as illustrated in FIG. 2 there are illustrated two exemplary telemetry data streams 200 and 240 from two different devices. While only two telemetry streams are illustrated in FIG. 2 it should be noted that any number of telemetry data streams can be analyzed and looked at. In some embodiments one or both of the telemetry data streams 200 and 240 are known to include malicious activity. The first device 201 has reported an anchor event 220 in the data and other events 214, 216 and 218 that occurred prior to the anchor event 220. The second device 250 has reported an anchor event 260 and other events 252, 254, 256 and 258 that occurred prior to the anchor event 260. In this example anchor events 220 and 260 are not the same anchor event. The arrows following the anchor events 220 and 260 are illustrated to indicate that there may be additional telemetry data after the anchor that is not illustrated. Further, in FIG. 2 only a few events are illustrated for simplicity. In an actual telemetry data stream there would be tens to thousands of events that could be present depending on the length of time analyzed. The concept of time is illustrated in FIG. 2 by the arrow identified as time.

The satellite identification component 150 then compares events 214, 216, 218 with events 252, 254, 256 and 258 to determine if any of the events are similar or related to each other. In some embodiments a similarity measure such as the Jacard similarity measure or the Cosine similarity measure can be used. This analysis may consider the type of event that these events are, the timing of the event in relationship to the anchor event (i.e. are the events within a predetermined period prior to the event 220 and 260), or anything else that may assist in determining if the events are similar to each other. While the events are illustrated in FIG. 2 as occurring before the anchor, again the satellite identification component 150 can also look at events that occurred after the anchor.

In the example of FIG. 2, the satellite identification component 150 determined that events 254 and 216 were similar events. The satellite identification component 150 labels events 254 and 216 as a satellite event 270. In embodiments where multiple different streams are analyzed a threshold number of streams having a similar event in them may have to be achieved prior to the event being identified as a satellite event 270. In this way the system 100 is able to minimize the number of false positives that it reports as satellites 270 back. However, in some embodiments simply having two streams have a similar event may be enough for the event to be labeled as a satellite event 270.

The satellite identification component 150 is further configured to use the satellite 270 in identifying other potential malicious events. First, in some embodiments, the identified satellite 270 is compared against a whitelist 165 of known safe events. In this way further analysis of a known safe event is not performed. Whitelist 165 is in some embodiments stored with the telemetry data in storage device 130. However, in other embodiments whitelist 165 may be a separate component accessed by the satellite identification component 150 and also the malware protection component 120. The satellite identification component 150 may convert the satellite 270 into a second anchor event and then request telemetry data from the storage device 170 for the devices 170 that reported the satellite 270. In this approach the satellite 270 becomes the anchor and the satellite identification component 150 looks for other events in the telemetry data for these devices 170 that are similar to the satellite event 270. This approach allows for the analysis of the telemetry back in time without apriori knowledge of any prior events.

The satellite identification component 150 is further configured to take the satellite event 270 and search for that event in other reported telemetry data for other devices 170. When a telemetry data stream is identified with the same satellite event 270 in that telemetry data, the satellite identification component 150 may determine that the identified satellite event 270 is associated with the deposit or installation of a file or other software code. This determination may be from the original analysis of the original telemetry data. (e.g. the similarity between events 254 and 216 was that they both dropped or caused to be downloaded the anchor event). Or it may be based upon information contained within the analyzed telemetry data. In this way the satellite identification component 150 is able to identify potential malware before the signature of the malware is actually known. This identification can cause the satellite identification component 150 to send a signal to the malware protection component 160 for the devices 170 instructing them to isolate any file that is dropped by the satellite event 270 regardless of whether or not the file is known to be malicious. In other embodiments if it is determined that the satellite event 270 is linked with a number of different malicious anchors the satellite identification component 150 may cause source of the satellite event 270 to be labeled as malicious such that the malware protection component 160 blocks access to the associated source. This approach defeats the malware author's approach of constantly changing the signatures of the malware to evade detection, but not changing the source or method of dropping the actual malware, which is significantly more time intensive and difficult for a malware author to achieve.

Figure 3:
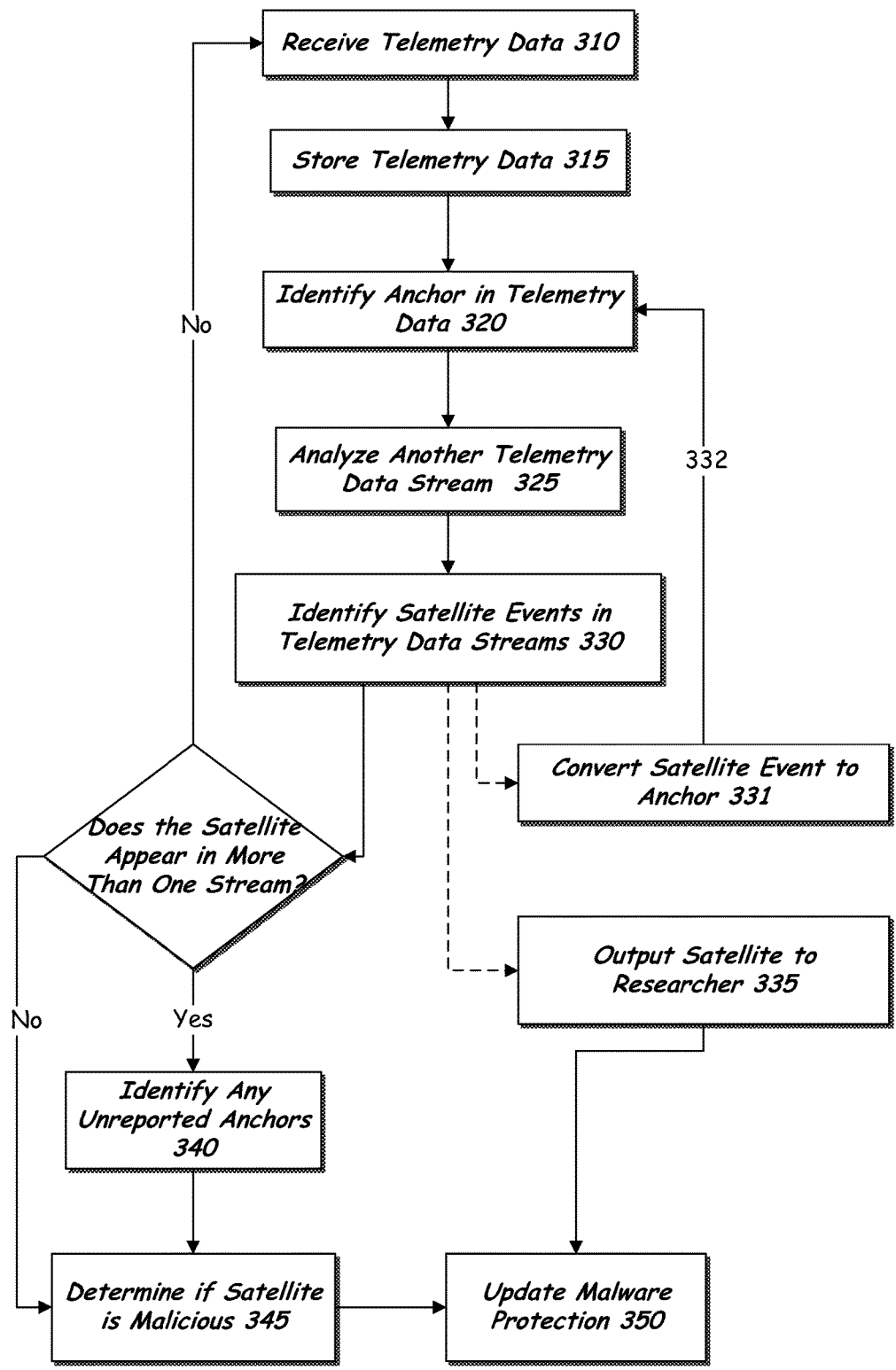
FIG. 3 is a flow diagram illustrating a process used by the system to identify satellites and malicious files according to one illustrative embodiment.

FIG. 3 is a flow diagram illustrating a process used by the system 100 to identify satellites and malicious files according to one illustrative embodiment. Each device 170 of the plurality of devices 170 reports telemetry data back to the system 100. This telemetry data may be constantly reported or only reported after the detection of a malicious event on the device 170. The telemetry data is data recorded from the device 170 about various activities of the device 170, such as what websites were accessed, what files were opened, what files were modified, what files were downloaded, etc. The malware protection component 160 can in some embodiments control when this telemetry data is sent. However, in other embodiments the telemetry gathering component 120 can query the malware protection component 160 to obtain telemetry data.

The telemetry data is received by the telemetry gathering component 120. This is illustrated at step 310. In some embodiments the telemetry gathering component 120 simply stores the telemetry data in the storage device 130. This approach can be useful when the system 100 is first starting up as there is not a lot of data to analyze. The storing of the telemetry data is illustrated at step 315. During the storage process the telemetry gathering component 120 may analyze the telemetry data to determine if an anchor has been identified or if there is sufficient data in the telemetry data to identify an anchor. If an anchor has not been identified the telemetry gathering component may pass the telemetry data to the anchor identification component 140 to identify the anchor in the telemetry data stream. In other embodiments the telemetry data passes through the anchor identification component 140 prior to storing the telemetry data. If there is not enough data in the telemetry data, the telemetry gathering component 120 may annotate the data to indicate that this is missing prior to the storage of the data in the storage component 130. In other embodiments the telemetry data may simply be discarded as not useful.

Once sufficient telemetry data has been obtained by the system 100 the satellite identification component 150 accesses at least a portion of the telemetry data that is stored in the storage component 130. The satellite identification component 150 takes one of the data streams associated with one of the telemetry data streams and identifies the anchor in that telemetry data. This is illustrated at step 320. In one embodiment this is performed by the anchor identification component 140 as the telemetry data stream is retrieved from the storage device 130. In another embodiment the telemetry data is analyzed prior to storing in the storage device. In this embodiment step 320 may occur prior to step 315.

The satellite identification component 150 then analyzes at least a portion of the other telemetry data streams that are currently stored in the storage component 130. This is illustrated at step 325. At this step the satellite identification component 150 identifies events (such as events 214, 216 and 218 of FIG. 2) that appear in the data stream for the current telemetry data and compares those events with events that are contemporaneous with events in other telemetry data (such as events 254, 256, and 258 of FIG. 2). In this approach the satellite identification component 150 takes an anchor in one of the other telemetry data streams and determines if there is a similar event that occurs in that data stream that is similar to an event that is present in the current telemetry data. This similarity can be, for example, that an identical event was noted in both streams, or that an event type (such as visiting a website, or viewing video) was identified within a specific time window from the anchors in both streams. In some embodiments the first telemetry data stream is known to contain malicious activity and the anchor may be already known to be malicious. In other embodiments the first telemetry data stream may not be known to include malicious activity, but the telemetry data streams used for the comparison are known to include malicious activity.

Once similar events have been identified by the satellite identification component 150, these events are labeled or otherwise identified as a satellite 270. The identification of at least one satellite 270 in the telemetry data is illustrated at step 330. In some embodiments multiple satellites 270 may be identified at this point, such as if there are multiple events in the telemetry data that meet the requirements. Further, in some embodiments an event is identified as a satellite event 270 if the event appears in a threshold number of telemetry data streams and meets the similarity requirements. This assists in the prevention of the identification of satellites 270 that are uncommon events in themselves. However, in other embodiments the threshold is not used as this can assist in identifying earlier potential sources of malware or malicious activity. In some embodiments the identified satellites 270 are compared against a whitelist 165 of known satellites 270 that are known not to be malicious. If a satellite 270 is found in the whitelist 165 the indication of a satellite 270 is removed from the telemetry data.

Once the satellite 270 has been identified by the satellite identification component 150 can executed a number of different processes. In one embodiment, the identified satellite 270 is analyzed to see if there are other satellites 270 that relate to it. In this embodiment the satellite 270 is converted or treated as if it were an anchor at step 331 and the process follows line 332 and repeats steps 320-330 to find if there are other satellites 270 related to it. In this way it is possible to identify a root satellite event 270. In other words, an event that is the source of the original anchor. Typically this can occur when a corrupt website redirects a device 170 to multiple different websites in an attempt to hide its true origins. This can also occur when the sites in the redirection chain are changed to help reduce the overall detection of the malicious activity.

The satellite identification component 150 can alternatively or at the same time as the above provide the identified satellite 270 to a malware researcher. This is illustrated by step 335. The malware researcher can receive from the satellite identification component 150 the telemetry data as well as the indication of the anchor event and the satellite 270 in the telemetry data. If more than one satellite 270 has been identified each of these may be provided to the researcher as well. The researcher can then determine if the satellite 270 or anchor is malicious, and then make or determine what changes need to be made to the system 100 or to the malware protection component 160.

In some embodiments the satellite identification component 150 can analyze all of the telemetry data in the storage device 130 and identify all telemetry data streams that share a particular satellite 270. When the satellite 270 is encountered in a different telemetry data stream the satellite identification component 150 can then look to see if there are any files or other activity that appears in that telemetry data stream that are associated with the satellite that corresponds to an unreported anchor. This is illustrated at step 340.

An unreported anchor is a file or other activity that is associated with the identified satellite 270. For example, the unreported anchor may be a file that appeared on the system at the same anchor timeframe as the original anchor, or could be a file that the telemetry data indicates originated from the satellite. However, other events may be tagged as unreported anchors based upon different determining factors. If an unreported anchor is found the satellite identification component 150 may tag the unreported anchor in the telemetry data as an anchor. In some embodiments the satellite identification component 150 may flag the unreported anchor for analysis by a malware researcher. In some embodiments, the satellite identification component 150 looks forward in the telemetry data from the satellite 270 to identify other files or events that are associated with the satellite 270. In this approach files or events that were not reported as anchors may be identified and analyzed as well such that other malicious files/events can be identified. These files or events may be added to the suspect list 155 or to a list of known malware 157.

In some embodiments the satellite identification component 150 may determine that a particular satellite 270 is malicious. This is illustrated at step 345. The satellite identification component 150 may determine that a satellite 270 is malicious if, for example, the satellite 270 appears in a threshold number of telemetry data streams, and is not present in the whitelist 165. By considering the satellite 270 separate from the anchor it is possible to identify the source of the malicious activity without having to know what the malicious file is or was. This is akin to knowing that a B-52 bomber flying overhead is going to drop something on a location without needing to know what it is going to drop, but that its mere presence is not a good thing.

If the satellite 270 is determined to be malicious the satellite identification component 150 can generate an update for the malware protection component 160 indicating that the particular satellite 270 is malicious. This update can instruct the malware protection component 160 to, for example, block all access to a site associated with the satellite event 270, block all downloads associated with the satellite 270, quarantine all files associated with the satellite 270 or any other action that would protect the end user or device 170. The update of the malware protection component 160 is illustrated at step 350. The process described herein continues to repeat itself to provide enhanced protection to the devices 170.

Figure 4:
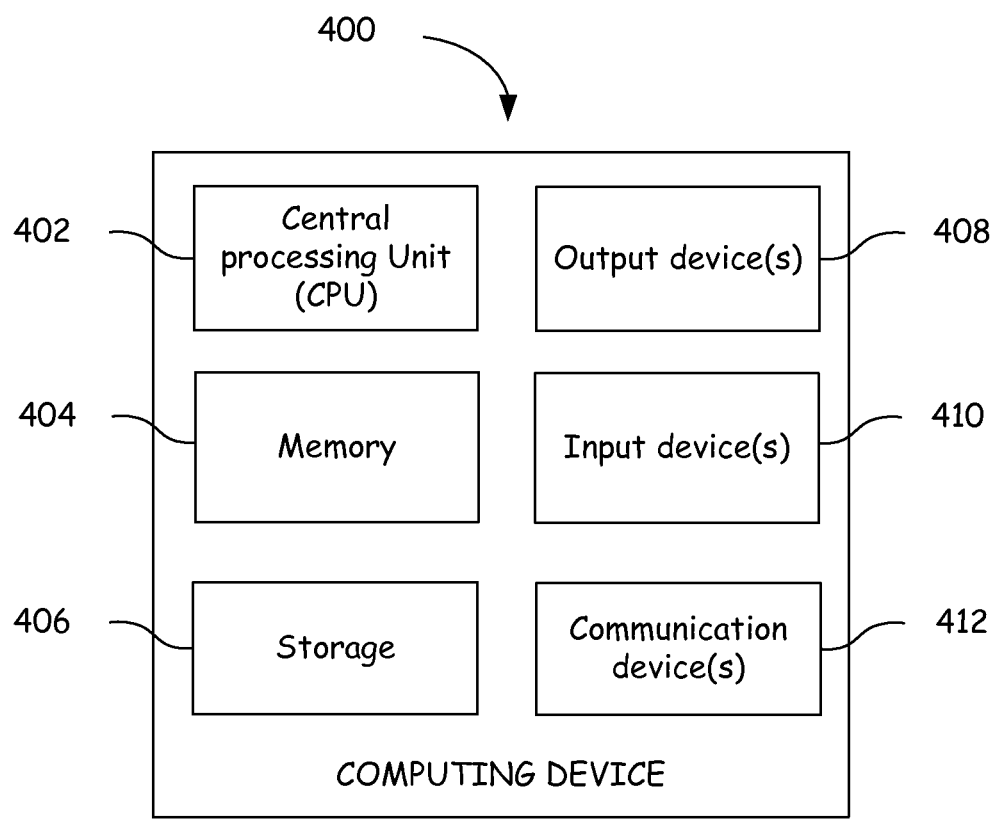
FIG. 4 illustrates a component diagram of a computing device according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 5 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for identifying potential malware comprising:
    identifying an anchor event in a first telemetry data stream, the anchor event occurring within an anchor timeframe comprising a predetermined time window before or after the time at which the anchor event occurred, the first telemetry data stream having a first plurality of events each identifying an activity performed by a first device, wherein the anchor event is an event identified as a potentially suspicious event;
    comparing to the first telemetry data stream a second telemetry data stream having a second plurality of events each identifying an activity performed by a second device distinct from the first device; and
    based on said comparing:
    identifying among the second plurality of events in the second telemetry data stream at least one satellite event occurring within the anchor timeframe that corresponds to one of the plurality of events in the first telemetry data stream, wherein the identifying at least one satellite event comprises determining that the at least one satellite event:
    is different from the anchor event; and
    has a relationship to the anchor event; and
    identifying in both the first and second telemetry data streams a second satellite event occurring within a second anchor timeframe, wherein the preceding steps are executed by at least one processor.

2. The method of claim 1 further comprising:
    receiving telemetry data from a plurality of devices, the telemetry data including at least one event identified as an anchor event.

3. The method of claim 1 further comprising:
    identifying the at least one satellite event in at least a third telemetry data steam; and
    identifying an unreported anchor event in the at least third telemetry data stream, wherein the unreported anchor event appears in the at least third telemetry data stream within an anchor timeframe determined in relation to a time of the anchor event.

4. The method of claim 3 wherein the unreported anchor event is classified as malicious.

5. The method of claim 1 further comprising:
    identifying the at least one satellite event in at least a third telemetry data stream; and
    classifying the at least one satellite event identified in the third telemetry data stream as a malicious event.

6. The method of claim 5 wherein classifying further comprising:
comparing the at least one satellite event to a whitelist of known safe events; and
classifying the at least one satellite event identified in the third telemetry data stream as the malicious event based at least on determining that the at least one satellite event does not appear in the whitelist.

7. The method of claim 5 further comprising:
updating a malware protection system with an indication that the at least one satellite event identified in the third telemetry data stream is malicious.

8. The method of claim 7 wherein updating comprises causing the malware protection system to block access to an Internet site associated with the at least one satellite event identified in the third telemetry data stream.

9. The method of claim 5 wherein classifying the at least one satellite event as a malicious event classifies when the at least one satellite event is present in more than a threshold number of telemetry data streams.

10. The method of claim 1, wherein identifying in both the first and second telemetry data streams a second satellite event occurring within a second anchor timeframe comprises:
treating at least one satellite event as a second anchor event; and
identifying in the first telemetry data stream and the second telemetry data stream a second satellite event occurring within an anchor timeframe from the at least one satellite event, wherein the second satellite event has a relationship to the at least one satellite event.

11. A system for identifying malicious activity comprising:
a telemetry gathering component configured to receive a plurality of telemetry data streams, wherein each of the plurality of telemetry data streams comprises a data stream received from a different device, each of the plurality of telemetry data streams having a plurality of events that each identify an activity performed by the device from which the telemetry data stream is received;
an anchor identification component configured to identify an anchor event in a first telemetry data stream among the plurality of telemetry data streams, the anchor event occurring within an anchor timeframe comprising a predetermined time window before or after the time at which the anchor event occurred; and
a satellite identification component configured to analyze the plurality of telemetry data streams to:
identify a first satellite event in at least a second telemetry data stream among the plurality of telemetry data streams, the identifying comprising:
comparing the first telemetry data stream to the second telemetry data stream, and
based on said comparing, determining that:
an event in the second telemetry data stream corresponds to the anchor event in the first telemetry data stream occurring within the anchor timeframe; and
the event in the second telemetry data stream also occurs within the anchor timeframe; and
identify in both the first and the second telemetry data streams a second satellite event occurring within a second anchor timeframe.

12. The system of claim 11 wherein the anchor event corresponds to a potential malicious event.

13. The system of claim 11 further comprising:
a malware protection component configured to identify potential malicious activity on at least one of the plurality of devices and provide telemetry data streams to the telemetry gathering component.

14. The system of claim 11 wherein the satellite identification component is further configured to identify the satellite event in a third telemetry data stream and to identify an unidentified anchor event in the third telemetry data stream, the unidentified anchor event having a relationship to the satellite event and occurring within the anchor timeframe.

15. The system of claim 14 wherein the satellite identification component is configured to flag the unidentified anchor event as potential malware.

16. The system of claim 11 wherein the second satellite event has a relationship to the first satellite event and occurs within a second anchor timeframe from the satellite event in both the first and the second telemetry data streams.

17. The system of claim 11 wherein the second telemetry data stream is a telemetry data stream known to include malicious activity.

18. The system of claim 11 wherein the first telemetry data stream is known to contain malicious activity and the second telemetry data stream is not known to contain malicious activity.

19. The system of claim 11 wherein the satellite identification component is configured to generate an update for a malware protection component such that the malware protection component blocks access to an Internet site associated with the satellite event.

20. One or more computer readable storage devices having stored thereon computer executable instructions that when executed by at least one processor cause at least one computing device to:
receive a plurality of telemetry data streams from a plurality of devices, each of the plurality of telemetry data streams having information related to events that occurred on a different associated device;
identify in a first telemetry data stream an anchor event having an associated anchor timeframe, the anchor event indicative of a potential malicious event in the first telemetry data stream and the anchor timeframe comprising a predetermined time window before or after the time at which the anchor event occurred;
compare the first telemetry data stream with a second telemetry data stream to identify a first satellite event and a second satellite event occurring in both the first and the second telemetry data streams, wherein the identifying further comprises determining that:
the first satellite event is different from and related to the anchor event in the first data stream;
the first satellite event occurring in the first telemetry data stream occurs within the anchor timeframe;
the first satellite event occurring in the second telemetry data stream occurs within the anchor timeframe; and
the second satellite event occurs within a second anchor timeframe from the first satellite event; and
update a malware protection component to block access to an Internet site associated with the first or second satellite event based on the satellite event appearing in at least two different telemetry data streams within the first or second anchor timeframe.

* * * * *